March 27, 1962
S. D. WILTSE
3,027,179
TUBE COUPLING STRUCTURE HAVING COMBINED
SEAL AND RETAINING MEANS
Filed April 17, 1959
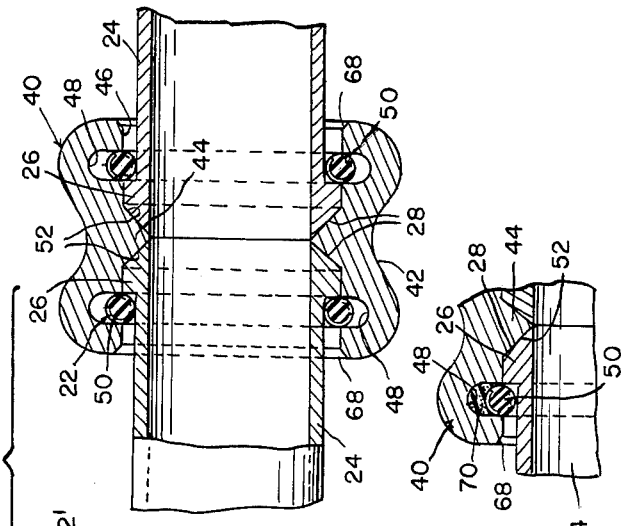
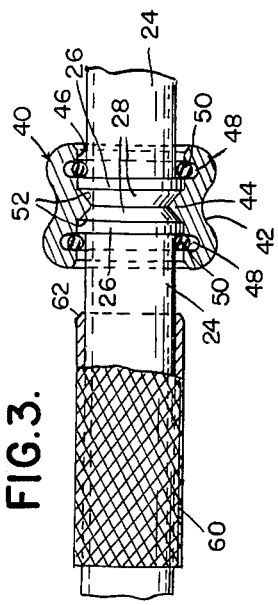
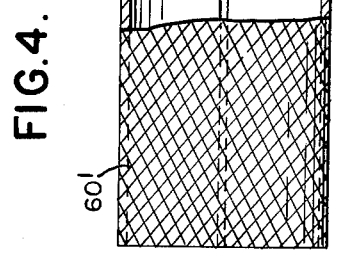
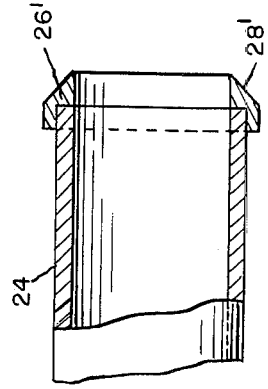
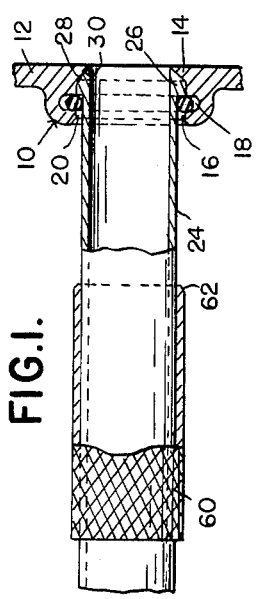
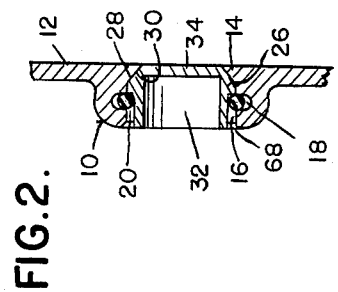
INVENTOR.
SUMNER D. WILTSE
BY
Whittemore, Hulbert & Belknap
ATTORNEYS

United States Patent Office 3,027,179
Patented Mar. 27, 1962

3,027,179
TUBE COUPLING STRUCTURE HAVING COMBINED SEAL AND RETAINING MEANS
Sumner D. Wiltse, 4943 Ridgewood Ave., Detroit, Mich.
Filed Apr. 17, 1959, Ser. No. 807,049
3 Claims. (Cl. 285—321)

This invention relates generally to tube couplings, and refers more particularly to expedient means for coupling one or more tubular members to a fitting.

One of the essential objects of the invention is to provide a coupling wherein one or more lengths of tubing may be locked automatically to a fitting by simply inserting the tubing into the fitting.

Another object is to provide a coupling wherein a sealing ring carried by the fitting is adapted to be received between and cooperate with axially spaced portions respectively of the fitting and tubing to lock the latter to the fitting and to provide a fluid-tight seal beween said fitting and said tubing.

Another object is to provide a coupling wherein the sealing ring is received within an inwardly opening radially extending annular channel within the fitting in axially spaced relation to one end thereof.

Another object is to provide a sealing ring that is expanded radially outward within said channel toward the closed base thereof by means of a cam portion of the tubing when the latter is manually inserted into the fitting, and that automatically contracts radially inwardly into locking and sealing position relative to said tubing when the latter is fully inserted into the fitting.

Another object is to provide a coupling wherein the depth of the channel is sufficient to enable the sealing ring to move radially therein to provide clearance for manual insertion or withdrawal of the tubing relative to said fitting.

Another object is to provide a coupling wherein the fitting has in axially spaced relation to said channel an abutment that serves to stop insertion of the tubing within the fitting at the right point to enable the sealing ring to move automatically as aforesaid to its locking and sealing position.

Another object is to provide a coupling wherein the interior of said fitting between the outer end thereof and said channel is spaced from said tubing a distance less than the radial thickness of said sealing ring, whereby said sealing ring is prevented from extruding or cold flowing into said space between said tubing and said fitting, but is spaced from said tubing a distance sufficient to permit a suitable tool to be inserted manually into said space to expand said sealing ring toward the closed base of said channel to provide clearance for manual withdrawal of said tubing from said fitting.

These and other objects and advantages in the practice of this invention will be made more apparent as this description proceeds, especially when considered in connection with the accompanying drawing, wherein:

FIGURE 1 is a fragmentary elevational view of a coupling embodying my invention between a length of tubing and a fitting, with parts broken away and in section, and showing a portion of a manually operable tool employed to expand the sealing ring within the fitting to provide clearance for manual withdrawal of the tubing from said fitting.

FIGURE 2 is a fragmentary sectional view through a fitting, closure member therefor, and sealing ring, and showing the latter in its locking and sealing position.

FIGURE 3 is a fragmentary elevational view of a coupling embodying my invention between two lengths of tubing and a fitting, with parts broken away and in section, and showing a portion of a manually operable tool employed to expand a sealing ring within the fitting to provide clearance for manual withdrawal of one length of tubing from said fitting.

FIGURE 4 is an enlarged fragmentary elevational view of the parts shown in FIGURE 3 arranged in a group, with parts broken away and in section.

FIGURE 5 is an enlarged fragmentary elevational view of a slightly modified end portion of a length of tubing adapted for use with either the fitting in FIGURE 1 or the fitting in FIGURE 3.

FIGURE 6 is a fragmentary longitudinal sectional view through a slightly modified coupling between a fitting and a length of tubing similar to that shown in FIGURE 3.

In brief, the coupling of this invention includes a tubular fitting receptive of a tubular member or conduit within one, or both, ends thereof. An annular flange within the fitting serves as an abutment for and limits insertion of the tubing into the fitting. A radially expansible and contractible composite sealing ring is provided within a radially extending annular channel within the fitting intermediate an end thereof and said annular flange to provide a fluid-tight seal between said fitting and said tubing and to lock said tubing to said fitting. Preferably the tubing has means for expanding the sealing ring radially within said channel when said tubing is inserted into the fitting, and has means adapted when said tubing engages the abutment aforesaid to become interlocked automatically with said sealing ring upon contraction thereof from its expanded position.

Referring to FIGURE 1, a tubular fitting 10 is a part of a wall 12 of a storage tank or similar receptacle and has a passageway 16 therethrough. A radially extending annular flange 14 is provided within the passageway 16 at one end thereof, and a radially extending annular channel 18 is provided within the fitting 10 intermediate the other end of said passageway 16 and said flange 14 and opens into said passageway 16. A preformed radially expansible and contractible substantially axially non-compressible composite solid elastic shear resisting sealing ring 20 of circular cross section is within the channel 18.

The annular channel 18 is of a size and depth which is receptive of the sealing ring 20 wholly therewithin. The sealing ring 20 may be a resilient annulus of the O-ring type or a resilient annulus having a helix spring 22 embedded therein adjacent but not protruding from the surface thereof as shown by FIGURES 4 and 6. In either case, it is such as is radially expansible within the annular channel 18 to provide clearance for the insertion of the conduit or tubing 24 into the fitting 10, and is contractible to become automatically interlocked with an outwardly projecting annular flange 26 on said tubing 24 to thereby lock said tubing 24 to the fitting 10.

The annular flange 26 on the tubing 24 and the annular flange 14 of the fitting 10 have complementary inclined portions 28 and 30 respectively that are in engagement with each other when the tubing 24 is inserted into the fitting 10, as shown in FIGURE 1. Thus the inclined portion 30 of the fitting 10 serves as an abutment or stop for the inclined portion 28 of the tubing 24 when the latter is inserted into the fitting. Such inclined portion 28 of the flange 26 on the tubing serves as a cam to expand the sealing ring 20 within the annular channel 18 toward the closed base thereof during insertion of the tubing into said fitting 10.

Once the annular flange 26 has passed inwardly beyond the ring receptive annular channel 18, the sealing ring 20 contracts automatically onto the tubing 24 to engage the back of said flange 26 and serve both as a lock and a fluid-tight seal between the tubing 24 and the fitting 10.

In FIGURE 2 the same fitting 10 is shown. However, a closure member 32 is shown disposed within the fitting. The closure member 32 is generally similar to the end aforesaid of conduit 24, just described, except that the closure member 32 includes an end closure wall 34.

Referring now to FIGURES 3 and 4, the fitting 40 is tubular in form and has a passageway 46 therethrough for receiving adjacent end portions of two lengths of tubing 24. Such fitting 40 is provided interiorly thereof at a point substantially midway its ends with a radially extending annular flange 44, and is provided between its ends and the flange 44 with a radially extending annular channel 48 opening into said passageway 46.

The fitting 40 is provided exteriorly thereof substantially midway its ends with a hand gripping annular depression 42. Sealing rings 50 similar to the sealing ring 20 are received within the annular channels 48 in the fitting 40.

Opposite sides of the annular flange 44 within the fitting 40 have inclined portions 52 complementary to the inclined portions 28 of the flanges 26 on the tubing 24, and such inclined portions 28 are engageable with the inclined portions 52 when the tubing 24 is inserted into the fitting 40 through opposite ends thereof. Thus the inclined portions 52 of the fitting 40 serve as abutments or stops for the inclined portions 28 of the tubing 24 when the latter is inserted into the fitting.

The inclined portions 28 of the tubing serve as cams to expand the sealing rings 50 within the annular channels 48 toward the closed bases thereof during insertion of the tubing into the fitting 40. Once the annular flanges 26 of the tubing have passed inwardly beyond the annular channels 48, the sealing rings 50 contract automatically onto the tubing 24 to engage the backs of said flanges 26 and serve both as a lock and a fluid-tight seal between the tubing 24 and the fitting 40.

Each annular flange 26 of the tubing 24 may be integral therewith as shown in FIGURES 1 to 4 inclusive, or may be formed separately as an annulus 26' and secured to such tubing, as shown in FIGURE 5. Any suitable means may be employed to secure the annulus 26' to the tubing 24. Such annulus 26' has an inclined portion 28' corresponding to the inclined portion 28 of the flange 26.

To disconnect the tubing 24 from either the fitting 10 or the fitting 40, a tool 60 in the form of a sleeve may be employed on the tubing 24. The tool 60 shown in FIGURES 1 and 3 may be exteriorly knurled for easier gripping, and has a chamfered end 62. The tool 60 is sleeved on the tubing 24 with its chamfered end 62 next adjacent the fitting. By sliding the tool 60 along the tubing 24 into the space between the interior of the fitting and the exterior of the tubing 24, the sealing ring within the fitting is expanded radially in the annular channel in the fitting to provide clearance for the annular flange 26 of the tubing 24 during withdrawal of the latter from the fitting.

A slightly modified tool 60' is shown in FIGURE 4. It is also sleeved upon the tubing 24 and has at one end thereof an outwardly offset or enlarged annular portion 66 provided with a chamfered end 62'. However, the tool 60' is split lengthwise, as at 64, so that such tool may be readily placed on or removed from the tubing 24. Such tool 60' functions similarly to the tool 60.

If desired, both ends of the tool 60 or the tool 60' may have opposite ends chamfered for disengaging either the seal 20 or the seal 50 from the tubing 24 when such tools are disposed on a length of tubing 24 provided at opposite ends thereof with fittings such as 10 or 40.

To facilitate the assembly of tubing with either the fitting 10 or the fitting 40, the ends of such fittings may be chamfered, as at 68. Such chamfering also facilitates the insertion of the tools 60 and 60' into the fittings when it is desired to remove the tubing 24 therefrom.

An annulus of sponge or foam rubber, other cellular elastomer, or the like 70 may be disposed within the ring receptive channels 14 and 44 of the fittings 10 and 40, if desired. Such an arrangement is shown in FIGURE 6.

The compressible member 70 within the channels 48 serve as backers for the sealing rings 50 and assist in maintaining the sealing rings 50 in locked and sealing engagement with the flanges 26 of the tubing 24. A cellular elastomer is preferred since it is sufficiently yieldable to impose no appreciable obstacle to the expansion of the sealing rings 50 within the channels 48 toward the closed bases thereof. However, quite obviously other yieldable or compressible backing means could be used, and the receptive channels 48 may be modified as necessary to accommodate such means without departing from the teachings of this invention.

As shown in FIGURES 1, 2, 3, 4 and 6, the interior of each fitting between the outer ends thereof and the channels therein is spaced from the tubing 24 a distance less than the radial thickness of the sealing rings, and the sealing rings are so constructed and arranged that they are prevented by their composition and characteristics from extruding or cold flowing into said space between said tubing and said fitting.

What I claim as my invention is:

1. In combination, a tubular member having at one end thereof a radially extending outwardly projecting annular flange provided with a radially extending inner surface and provided with an outer surface inclined rearwardly toward said radially extending inner surface, an annular one-piece fitting encircling the end aforesaid of said tubular member and having an integral radially extending annular rigid flange and a radially extending annular channel, the annular flange of said fitting being within the interior thereof in the path of and constituting a rigid abutment for the inclined surface of the annular flange of said tubular member, the annular flange of said fitting having an inclined surface complementary to and having surface-to-surface engagement with the inclined surface of the annular flange of said tubular member, said annular channel being intermediate the annular flange of said fitting and an outer end of said fitting and opening radially inwardly toward the exterior of said tubular member at a point beside the radially extending inner surface of the annular flange of said tubular member, the inner side wall of said channel having a radially extending surface normal to the axis of said fitting and disposed substantially in radial alignment with and constituting an extension of the radially extending inner surface of the annular flange of said tubular member, the outer side wall of said channel having a radially extending surface normal to the axis of said fitting and disposed in diagonally opposed relation to the radially extending inner surface of the annular flange of said tubular member, and a single means providing a fluid-tight seal between said tubular member and said fitting and preventing accidental withdrawal of said tubular member from said fitting comprising a resilient radially expansible and substantially axially noncompressible shear resisting annularly integral ring of circular cross section disposed between and having surface sealing engagement with the diagonally opposed radially extending surfaces aforesaid, the inclined surface of the annular flange of said tubular member being operable during manual insertion of the end aforesaid of said tubular member within said fitting to expand said ring to a position within said annular channel to provide clearance for the annular flange of said tubular member, said ring contracting through its own resilience from said expanded positon onto said tubular member into the sealing engagement aforesaid with said diagonally opposed radially extending surfaces when the inclined surface of the annular flange of said tubular member is disposed in surface-to-surface engagement with the inclined surface of the annular flange of said fitting, the radially extending surfaces of said channel constraining the movement of said ring to movement only in a direction normal to the longitudinal axis of said fitting, said channel being adapted to substantially completely receive the expanded ring to provide clearance for manual insertion or withdrawal of the annular flange of said tubular member relative to said fitting, the interior of said fitting between the outer end thereof and said channel being spaced from said tubular member a distance less than the radius of the cross section of said sealing means.

2. The combination described in claim 1, wherein an annulus of elastic material is within said channel between the base thereof and said ring to serve as a yieldable backing for said ring.

3. In combination, a pair of axially aligned tubular members having end portions arranged in abutting end-to-end relation, each end portion having a radially extending outwardly projecting annular flange provided with a radially extending inner surface and provided with an outer surface inclined rearwardly toward said radially extending inner surface, an annular one-piece fitting encircling both end portions of said tubular members, said fitting having a pair of longitudinally spaced radially extending annular channels and having an integral radially extending annular rigid flange, said annular channels being itermediate the outer ends of said fitting and the annular flange of said fitting and opening radially inwardly toward the exterior of said tubular members at points besides the radially extending inner surfaces of the annular flanges of said tubular members, the inner side walls of said channels having radially extending surfaces normal to the axis of said fitting and disposed substantially in radial alignment with and constituting extensions of the radially extending inner surfaces of the annular flanges of said tubular members, the outer side walls of said channels having radially extending surfaces normal to the axis of said fitting and disposed in diagonally opposed relation to the radially extending inner surfaces of the annular flanges of said tubular members, the annular flange of said fitting being within the interior thereof in the path of and constituting a common rigid abutment for the inclined surfaces of the annular flanges of said tubular members, the annular flange of said fitting having oppositely inclined surfaces complementary to and having surface-to-surface engagement with the inclined surfaces of the annular flanges of said tubular members, and means providing fluid-tight seals between said tubular members and said fitting and preventing accidental withdrawal of said tubular members from said fitting comprising resilient radially expansible and substantially axially non-compressible shear resisting annularly integral rings of circular cross section respectively disposed between and having surface sealing engagement with the diagonally opposed radially extending surfaces aforesaid, the inclined surfaces of said tubular members being operable during manual insertion of the end portions of said tubular members within said fitting to expand said rings to positions within said annular channels to provide clearance for the annular flanges of said tubular members, said rings contracting through their own resilience from said expanded positions onto said tubular members into the sealing engagement aforesaid with said diagonally opposed radially extending surfaces when the inclined surfaces of the annular flanges of said tubular members are disposed in surface-to-surface engagement with the oppositely inclined surfaces of the annular flange of said fitting, the radially extending surfaces of said channels constraining the movement of said rings to movement only in a direction normal to the longitudinal axis of said fitting, said channels being adapted to substantially completely receive the expanded rings to provide clearance for manual insertion or withdrawal of the annular flanges of said tubular members relative to said fitting, the interior of said fitting between the outer ends thereof and said channels being spaced from said tubular members a distance less than the radius of the cross section of said sealing means.

References Cited in the file of this patent

UNITED STATES PATENTS

| 2,630,337 | Snyder | Mar. 3, 1953 |
| 2,944,840 | Wiltse | July 12, 1960 |

FOREIGN PATENTS

| 543,733 | Great Britain | Mar. 10, 1942 |
| 405,461 | Italy | Aug. 14, 1943 |
| 671,466 | Great Britain | Mar. 4, 1944 |

UNITED STATES PATENT OFFICE
CERTIFICATE OF CORRECTION

Patent No. 3,027,179            March 27, 1962

Sumner D. Wiltse

It is hereby certified that error appears in the above numbered patent requiring correction and that the said Letters Patent should read as corrected below.

Column 3, line 75, for "14 and 44" read -- 18 and 48 --.

Signed and sealed this 3rd day of September 1963.

(SEAL)
Attest:

ERNEST W. SWIDER
Attesting Officer

DAVID L. LADD
Commissioner of Patents